Feb. 11, 1941.  P. M. CAMIENER  2,231,153
SPRING CLIP
Filed Jan. 11, 1940

Inventor
Paul M. Camiener
By Blackmore, Spencer & Flint
Attorneys

Patented Feb. 11, 1941

2,231,153

UNITED STATES PATENT OFFICE 2,231,153

SPRING CLIP

Paul M. Camiener, Detroit, Mich., assignor to General Motors Corporation, Detroit, Mich., a corporation of Delaware Application January 11, 1940, Serial No. 313,327

7 Claims. (Cl. 24—73)

This invention relates to metal clips and has particular reference to a metal clip used in automobile production to hold a panel to a door, a conduit or wire to the chassis, or the like.

The particular novelty to the clip resides in making it of a single piece of metal with two spaced arms. The clip is suitably bent to form fingers at the tips of the arms and formed with wing parts intermediate the tip and the end of the clip. The clip is so constructed that its end may extend through an opening with the finger tips engaging one side of an object while the wings engage the other side at the opening edge. The arms on the clip are capable of being pressed together so that the wings may pass through an opening and then engage with the side of the object at the opening edge opposite to the side from which the clip was inserted. A suitably shaped end part of the clip is adapted to hold a wire or conduit in place or to engage with the edge of the door to hold a panel in place.

Figure 3:
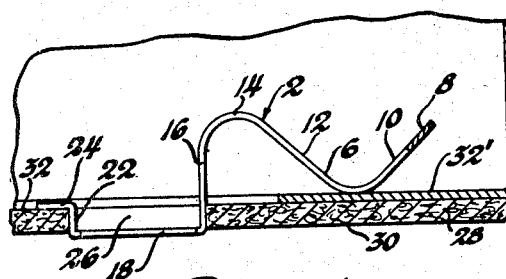
Figure 3 is a sectional view on the line 3—3 of Figure 2.

Referring to the drawing, the numeral 2 indicates the clip as a whole. The clip is formed of a single piece of metal and has the lateral arms 4 and 6 connected at one end by the transverse member 8. Both arms have the end portion 10 and the adjacent portion 12 bent at an angle to each other as is best seen in Figure 3. The part 12 forms one side of a loop or an arcuate part indicated as a whole at 14, the other side of the loop being indicated at 16. The side 16 of the loop 14 is substantially straight and beyond the straight portion 16, wings 18 are formed on the arms 4 and 6.

Each wing 18 has the extension or projection 20 at the side thereof. Beyond the wings 18 the metal of the clip is bent at right angles to form the intermediate part 22 and beyond the intermediate part the arms terminate in the fingers 24. Parts 22 and 24 are in parallel planes at the opposite side of the wings 18 as is best shown in Figure 3.

Figure 1:
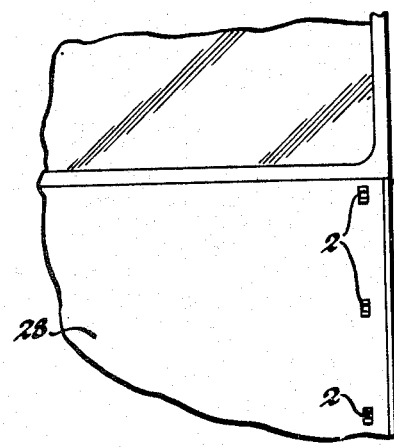
Figure 1 is a view of the rear face of the door showing the clip used to secure a panel in place.
Figure 2:
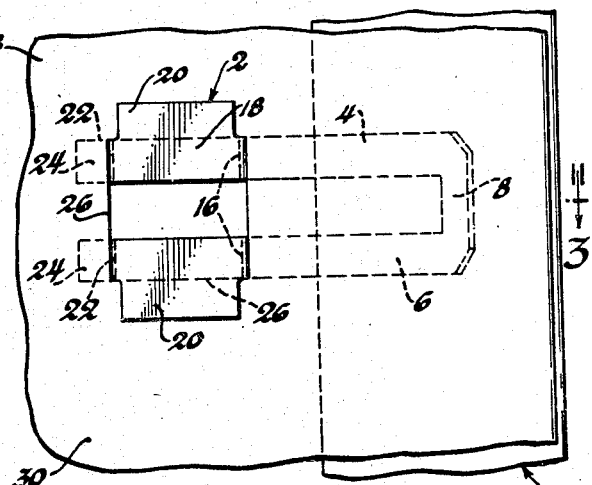
Figure 2 is an enlarged view in elevation of one of the clips as applied in Figure 1.

The application of the clip is best shown in Figures 2 and 3.

The opening 26, in a panel 28 or the like, is of sufficient length snugly to receive between its edges the side 16 of the loop 14 and the intermediate part 22 at the finger end of the arms 4 and 6. The width of the opening 26 is smaller than the distance between the sides 20 of the wings. In order to apply the clip, the arms 4 and 6 are bent toward each other a sufficient distance to enable the extensions 20 of the wings 18 to be pressed or forced through the opening 26. The arms 4 and 6 are then allowed to expand which will cause the wings 20 to pass under the side 30 of the panel 28. The fingers 24, however, will be positioned on the opposite side 32 of the panel. With the wings 20 on one side of the panel, the fingers 24 on the other side, and the snug fit of the shoulders formed by the junction of parts 16 and 22 with the wings 18 in the opening 26, there will be a close and secure fit in the opening 26. In the applied position of the clip, the side edge of the parts 16 and 22 preferably abut the edge of the opening.

The loop 14, as shown in Figure 3, projects upward and away from the panel 28 and the angle between parts 10 and 12 will be yieldingly pressed against the inwardly extending flange 32' formed on the door 34. The application of the clip, as shown in detail in Figures 2 and 3, will hold the panel 28 on the door 34.

Figure 4:
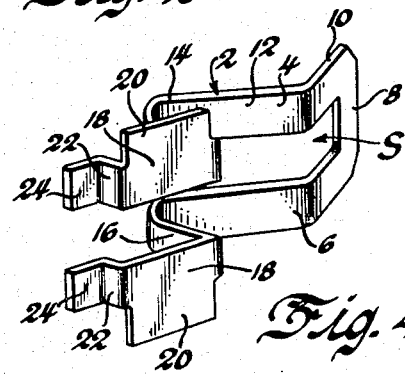
Figure 4 is a perspective view of the clip.
Figure 5:
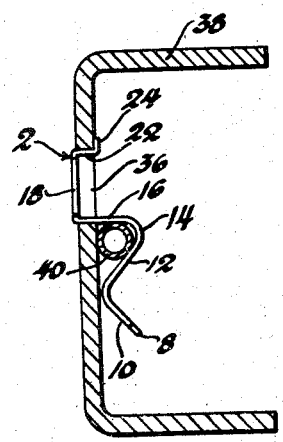
Figure 5 is a sectional view through one of the side members of the chassis of an automotive vehicle, showing the clip applied to an opening in the chassis and retaining a conduit.

In Figure 5 the clip 2 is the same as that shown in Figure 4, but it is applied to an opening 36 in the frame or chassis 38 of an automotive vehicle. In the case of Figure 5, the clip is used to hold a conduit 40 in place. The conduit is sprung under the inclined part 10 and is yieldingly held in the loop 14.

Figure 6:
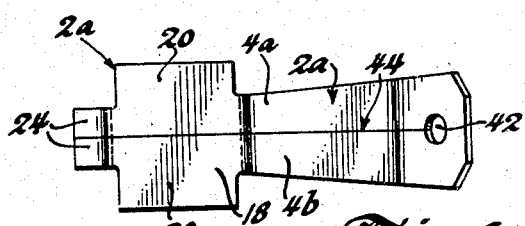
Figure 6 is an elevational view of a modified form of clip.
Figure 7:
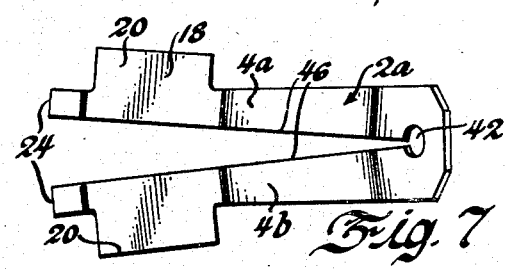
Figure 7 is a view similar to Figure 6, but showing the arms of the clip in expanded condition, or in the condition in which they appear before the clip is to be applied.

In Figures 6 and 7 a modification of the clip is shown. The clip is made of a single piece of metal, but instead of having a part of the metal cut out to form the blank space S indicated in Figure 4, the clip has an opening 42 at one end and a split 44 is formed from the opening to the end of the clip. The clip is then spread apart as indicated at 46 in Figure 7 so that the wings 18 and their projections 20 will be spaced a distance greater than the width of the opening to which the clip is applied.

In the same manner as is described in connection with the species of Figure 4, the arms 4a and 4b of the clip 2a are pinched together to enable the application of the wings 18 and their extensions 20 to the opening. When the wings are on the underside of the object in which the opening is formed, the arms 4a and 4b are released to allow the wings 20 to expand and become positioned against the face of the object at the margin of the opening.

I claim:

1. In a clip to secure a panel, a wire, or the like to an object, said panel having an opening to receive the clip, two arms, means to connect the arms at one end, shoulders on the other end of the arms, said shoulders being spaced sufficiently to enable them closely to fit against the opposite sides of the opening, wings on the ends of the arms, said wings projecting beyond the edges of the opening and fitting against the face of the object at the opening sides, fingers on the ends of the arms, said fingers projecting beyond the edge of the opening and fitting against the opening sides at the side opposite the wings, and means on the clip engaging the object to retain the panel on the object.

2. In a clip, two spaced arms interconnected at one end, wings formed on the free ends of the arms, said arms adapted to be pressed toward each other to enable the wings to pass through an opening in an object, said arms respreading to their original position when the wings have been passed through the opening to enable the wings to engage with the face of an object at the edge of the opening, fingers formed on the ends of the arms beyond the wings, said wings having a part adapted to engage the object at the opening edge on the side of the object not engaged by the wings, said wings and fingers being shaped to form shoulders which closely engage with the sides of the opening to hold the clip in place.

3. In a clip, two spaced arms interconnected at one end, wings formed on the free ends of the arms, said arms adapted to be pressed toward each other to enable the wings to pass through an opening in an object, said arms respreading to their original position when the wings have been passed through the opening to enable the wings to enage with the face of an object at the edge of the opening, fingers formed on the ends of the arms beyond the wings, said fingers having a part adapted to engage the object at the opening edge on the side of the object not engaged by the wings, said wings and fingers being shaped to form shoulders which closely engage with the sides of the opening to hold the clip in place, and means at the ends of the arms to engage a second object.

4. In a clip made of a single piece of metal and formed generally of U shape, arcuate parts formed in each arm of the U intermediate the ends of the arms, wings formed at the ends of the arms, said wings being at substantially right angles to the end of the arcuate part, fingers of angular shape formed on the tips of the arms, part of the fingers being parallel with the side of the arcuate part adjoining the wings, said clip adapted to fit into an opening with the wings extending beyond the opening edge on one side of the object and the fingers extending beyond the opening edge at the other side of the object, the angles of said clip formed by the wings and fingers snugly fitting into the opening.

5. In a clip made of a single piece of metal and formed with two spaced arms, a wing and a finger formed on the end of each of the arms, shoulders at opposite ends of said wings, said shoulders adapted snugly to fit into an opening in an object, said fingers being in a plane parallel with the plane of the wings, said arms being capable of being pressed together to enable the wings to pass through an opening, the arms being capable of spreading after the wings have passed through the opening to enable the wings to engage one side of the object at the margin of the opening, said fingers engaging the other side of the object at the opening edge to hold the clip in place.

6. In a clip made of a single piece of metal and formed with two spaced arms, a looped part formed intermediate each arm, said looped part adapted to hold a wire or other element, a wing part at substantially right angles to one side of said looped part, extensions on said wing projecting beyond the sides of the arms, fingers on the ends of said arms, said fingers being angular in shape, the ends of said fingers being in a plane parallel with the plane of the wings.

7. In a clip, arms united at one end only, wings formed adjacent the free end of each arm, angularly shaped fingers at the tips of the arms, the ends of said fingers being in a plane parallel with the plane of the wings.

PAUL M. CAMIENER.